(12) United States Patent
Plottier et al.

(10) Patent No.: US 6,384,376 B1
(45) Date of Patent: May 7, 2002

(54) METHOD AND DEVICE FOR PULSED ARC WELDING

(75) Inventors: Gérard Plottier, Pierrefitte; Francis Briand, Paris, both of (FR)

(73) Assignee: La Soudure Autogene Francaise, Paris Cedex (FR)

( * ) Notice: Subject to any disclaimer, the term of this patent is extended or adjusted under 35 U.S.C. 154(b) by 0 days.

(21) Appl. No.: 09/308,718

(22) PCT Filed: Nov. 18, 1997

(86) PCT No.: PCT/FR97/02070

§ 371 Date: Jul. 16, 1999

§ 102(e) Date: Jul. 16, 1999

(87) PCT Pub. No.: WO98/22247

PCT Pub. Date: May 28, 1998

(30) Foreign Application Priority Data

Nov. 22, 1996 (FR) ............................................. 96 14135

(51) Int. Cl.⁷ ................................................ B23K 9/09
(52) U.S. Cl. .............................. 219/130.51; 219/137 PS
(58) Field of Search ....................... 219/130.51, 137 PS

(56) References Cited

U.S. PATENT DOCUMENTS

| | | | |
|---|---|---|---|
| 4,459,460 A | | 7/1984 | Ogilvie et al. |
| 5,017,757 A | * | 5/1991 | Kawai et al. ........... 219/130.51 |
| 5,157,236 A | * | 10/1992 | Batzler et al. ......... 219/130.51 |
| 5,643,479 A | * | 7/1997 | Lloyd et al. ............ 219/130.51 |
| 5,824,991 A | * | 10/1998 | Mita et al. ............. 219/130.51 |

FOREIGN PATENT DOCUMENTS

JP     57-124572     *  3/1982

* cited by examiner

Primary Examiner—Clifford C. Shaw
(74) Attorney, Agent, or Firm—Young & Thompson

(57) ABSTRACT

A method and a device for pulsed arc welding in which the electric current has conductance with pulse drops and/or pulse rises between 50 A/ms and 1000 A/ms, and more particularly between 100 A/ms and 500 A/ms, with the exception of a triangular pulse. The invention is applicable to MIG or MAG welding.

9 Claims, 4 Drawing Sheets

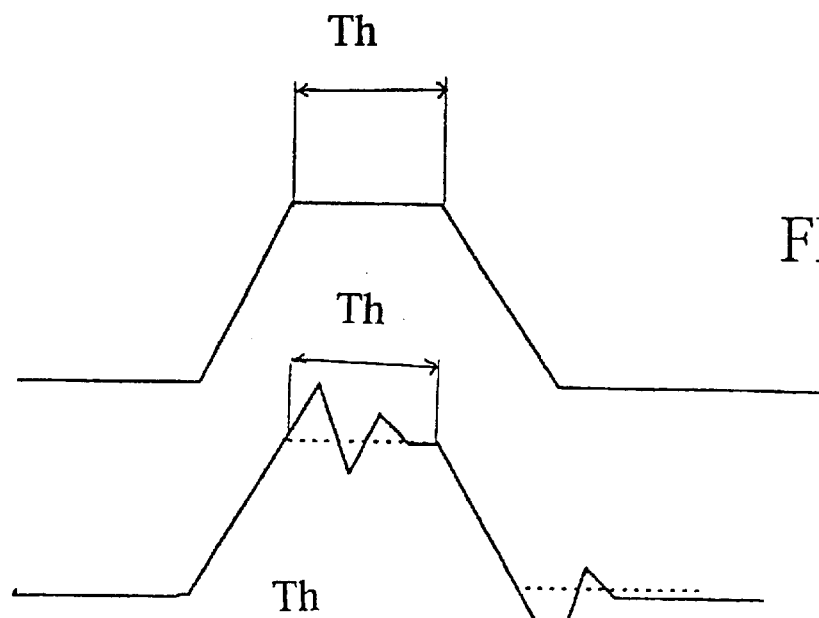
FIG. 7
FIG. 8
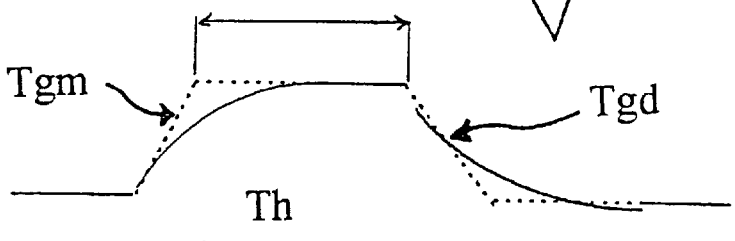
FIG. 9
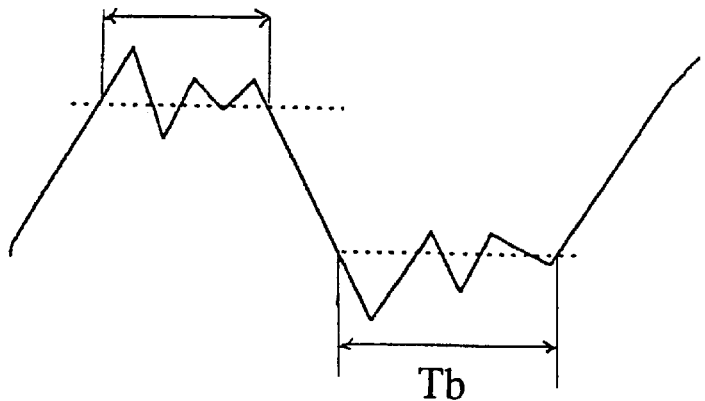
FIG. 10

METHOD AND DEVICE FOR PULSED ARC WELDING

CROSS REFERENCE TO RELATED APPLICATION

This is the 35 USC 371 national stage of International application PCT/FR97/02070 filed on Nov. 18, 1997, which designated the United States of America.

FIELD OF THE INVENTION

The present invention relates to pulsed-current arc welding processes and apparatuses, and more particularly to gas-shielded pulsed-current arc welding processes and apparatuses using consumable wire.

BACKGROUND OF THE INVENTION

In general, gas-shielded arc welding processes using consumable wire consist in striking an electric arc between the sheets to be welded and a consumable welding wire. The consumable wire undergoing a translational movement is progressively melted by the arc and thus contributes to the formation of a weld bead.

The fact of being able to feed the wire at different speeds gives rise to the existence of several modes of operation, the welding characteristics of which are completely different. Depending on the value of the current and of the voltage, the way in which the molten metal is transferred from the wire to the liquid pool varies considerably.

At low currents (80 to 150 A), the Joule effect and the heat released by the arc melt the end of the wire, thus forming a drop of molten metal. Since the wire continues to advance, the drop comes into contact with the weld pool. There is then a short circuit (extinction of the arc) and it is at that moment that the drop is detached, and then transferred into the pool. When the transfer has taken place, the arc is reignited and the process may thus start all over again. This constitutes the short-circuit transfer (short arc) mode.

At higher currents (150 to 250 A), the transfer mode is globular. This transfer mode is not used very much in practice since it results in erratic transfer and in considerable spatter. In this mode, the drop may grow inordinately and either explode before any contact with the sheet or be transferred by short-circuiting incorrectly, often outside the pool.

At very high currents and about 30 to 35 V, depending on the shielding gas used, the welding enters the axial spray (spray-arc) mode in which a string of small drops of molten metal regularly escape from the end of the molten wire.

The current in this case is high enough to expel the drops formed before any contact with the sheet.

There is a fourth, more artificial, transfer mode which, from the standpoint of the average welding energy, lies within the globular range: this is the pulsed mode. In this case, welding is carried out using a pulsed current, the pulse parameters being chosen in such a way that, for each pulse, transfer is of the spray-arc type with a single drop per pulse. This requires special generators in which the current waveform is controlled. This mode is often used as it allows good transfer within an average energy range in which conventional DC welding is difficult to put into practice. However, this mode is very noisy and it is not unusual to reach levels of acoustic noise close to 100 dBA (at 40 cm from the arc), which quite easily exceed the thresholds defined in the legislation concerning the regulation of noise emitted by machines. In pulsed mode, the pulse may have various waveforms: the trapezoidal waveform is most used in practice, but it is possible, by means of transistorized current transformers, to give the pulse various waveforms, while still controlling quite well the parameters which define it.

The procedure for establishing a pulsed-current welding programme consists in finding the most suitable situation between the pulse parameter values and the desired welding result. That is to say, for each wire, shielding gas and wire feed speed, it is necessary to determine the values of these parameters which best satisfy the criteria according to which the welding operation is judged. In general, a good pulsed-current welding programme must be one in which only one drop is detached per pulse, with drop diameters of about the diameter of the wire. For a given wire feed speed, this therefore determines a pulse frequency. Moreover, the common belief is that the rise and fall slopes of the current should be as high as possible so as to obtain stiff and highly directional arcs which, for most operators, are the best way of producing a weld bead in pulsed mode. The other parameters are generally chosen empirically.

Thus, the document JP-A-57,124,572 describes a pulsed arc welding process using a consumable electrode and a shielding gas consisting of an inert gas. According to this document, the amplitude of the current must be at least 300 A, and the duration extending between the start of the current increase and the start of the current fall, that is to say including the peak time during which the current is at its maximum value, is between 0.2 ms and 4 ms, this being the case for triangular or rectangular pulses.

However, the problem of noise pollution caused during an arc welding operation in pulsed mode has not hitherto been solved.

SUMMARY OF THE INVENTION

The object of the invention is therefore to provide an arc welding process in pulsed mode having an acceptable level of acoustic noise (of less than approximately 90 dBA) and good welding characteristics.

For this purpose, the subject of the invention is a pulsed-current arc welding process, characterized in that each electric current pulse has rise and/or fall slopes of between 50 A/ms and 1000 A/ms, apart from triangular pulses.

Preferably, each current pulse has a peak time of non-zero duration.

Within the context of the present invention, the expression "pulse having a peak time of non-zero duration" should be understood to mean a pulse whose representation, visualization or measurement shows that there is a non-zero duration separating the end of the rise of the current and the start of the fall of the current. Over the period of this non-zero duration of the peak time, the amplitude of the current may, depending on the case, be maintained approximately constant or, in contrast, may undergo slight variations, as will be explained in detail below.

Depending on the case, the process may include one or more of the following characteristics:
- the rise and/or fall slopes are between 100 A/ms and 600 A/ms, preferably between 150 A/ms and 500 A/ms;
- the arc welding process is a consumable-wire process;
- the pulse frequency is adjusted so as to obtain drops of molten metal with a diameter, at the moment of their release, of between 1 and 1.4 times the diameter of the consumable wire;
- the pulse frequency is adjusted so as to obtain drops of molten metal with a diameter, at the moment of their release, of approximately 1.2 times the diameter of the consumable wire;

the pulses are trapezoidal;

the pulses are composed of a combination of several identical, similar or different patterns chosen from trapezoidal, sinusoidal, triangular, rectangular and square patterns;

the welding process is carried out under a flow of shielding gas that includes an active gas; and the active shielding gas comprises argon and/or helium, and at least one compound chosen from $CO_2$, $H_2$, $O_2$ and mixtures thereof.

The present invention furthermore relates to a welding apparatus capable of implementing the process according to the invention and, in particular, to a pulsed-current arc welding apparatus that includes means allowing electric current pulses to be obtained which have rise and/or fall slopes of between 50 A/ms and 1000 A/ms, apart from triangular pulses.

Preferably, the apparatus of the invention allows pulses to be obtained which furthermore have a peak time of non-zero duration.

BRIEF DESCRIPTION OF THE DRAWINGS

The invention will be more clearly understood on reading the description which follows, given solely by way of example, and with reference to the drawings in which:

FIG. 7 shows a trapezoidal pulse shape according to the invention; and

FIGS. 8 to 10 show a distorted trapezoidal shape.

DETAILED DESCRIPTION OF THE INVENTION

Figure 1:
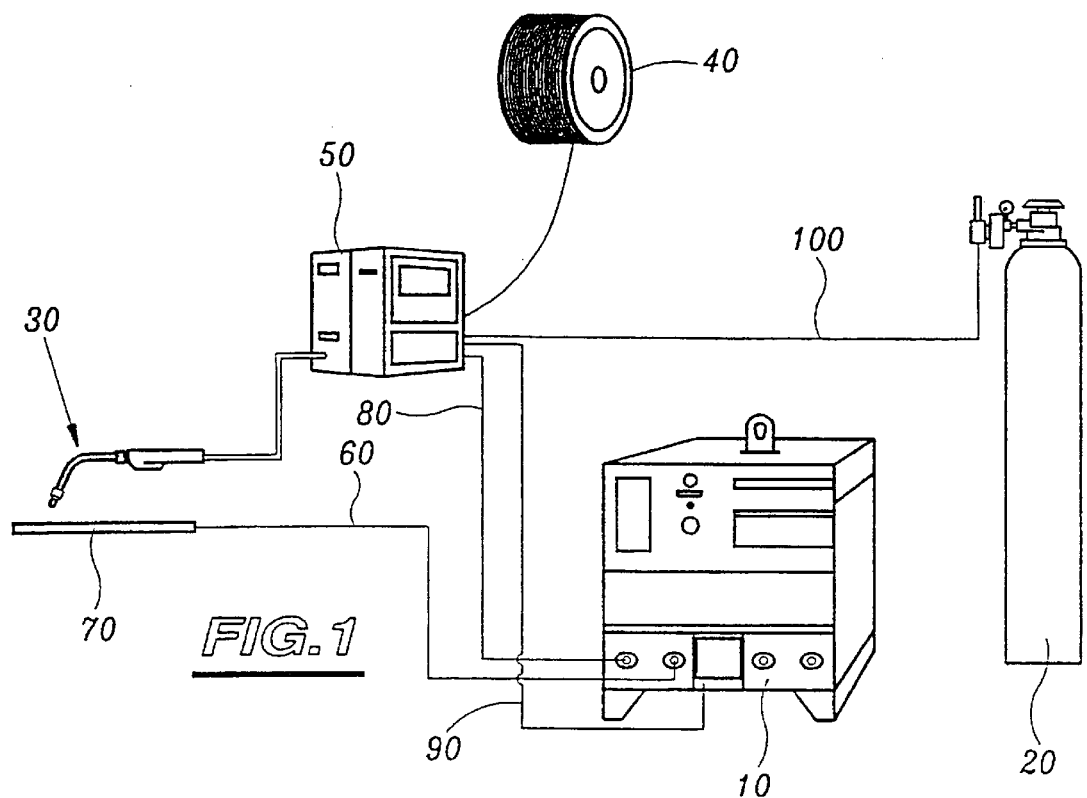
FIG. 1 is a diagrammatic view of a gas-shielded shielded consumable-wire arc welding set.

The arc welding set in FIG. 1 essentially comprises a transistorized electric current generator 10, a gas supply 20, a welding torch 30, a consumable-wire supply reel 40 and a consumable-wire drive feed unit 50. The generator 10 is connected via a first cable 60 to the sheets 70 to be welded, and via a second cable 80 to the consumable-wire drive feed unit 50 so as to deliver the desired electrical signal between the consumable wire and the sheets to be welded. A pipe 100 allows the torch to be supplied with gas via the drive feed unit 50. Moreover, a control cable 90 connects the generator 10 to the consumable-wire drive feed unit 50 so as to tailor the current amplitude to the wire feed speed.

Figure 2:
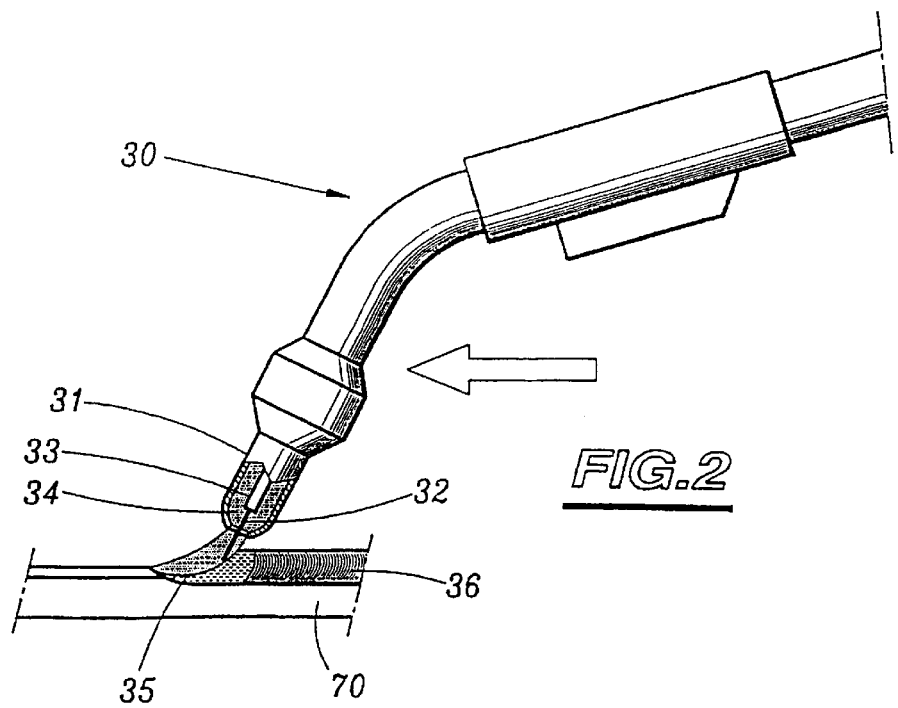
FIG. 2 is a diagrammatic view, with cut-away, of a process for welding sheets carried out using such a set.

FIG. 2 shows diagrammatically the operation of welding sheets by means of the torch 30. The figure shows, in the end nozzle 31 of the torch, the terminal part of the consumable wire 32, a contact tube 33 which guides this wire and supplies it with the electric current, a column of gas 34 shooting forth from the torch towards the sheets 70 to be welded, and the weld pool 35 which comes from the melting of the sheets and the consumable wire and which, after cooling, forms a weld bead 36.

Figure 3:
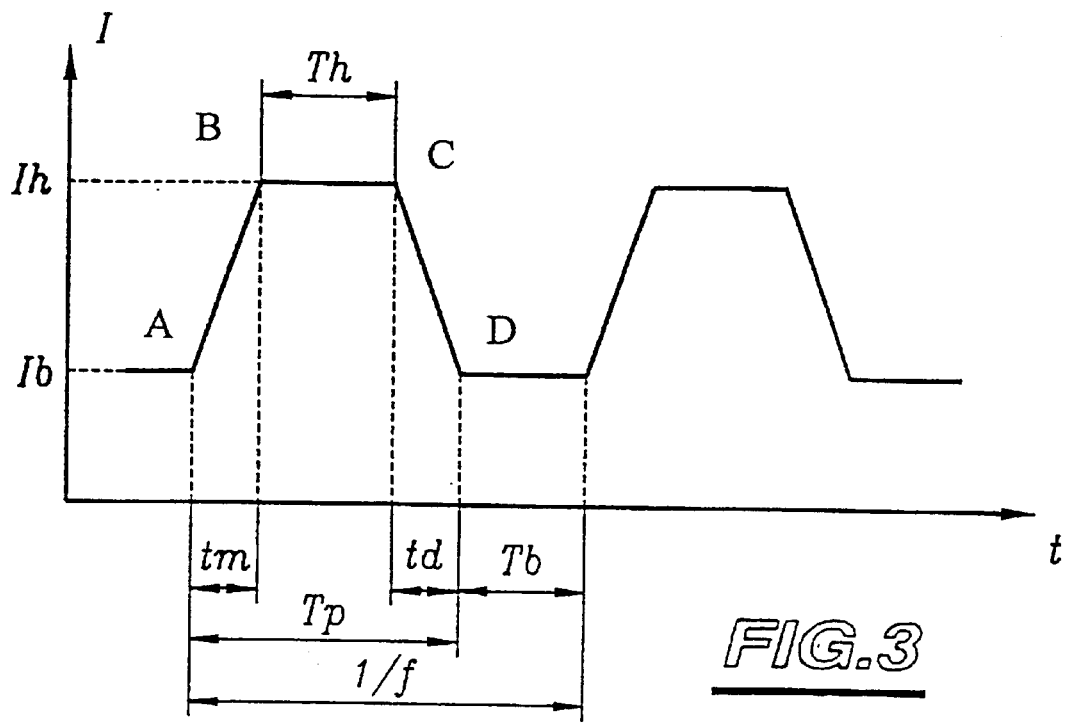
FIG. 3 is a graph showing a trapezoidal electric pulse which has the characteristics of the invention.

FIG. 3 shows a graph of a trapezoidal electric pulse, this being the pulsed current waveform most used in pulsed-current arc welding. In this graph, the time t is plotted on the x-axis and the current I is plotted on the y-axis. The parameters defining the signal shown in FIG. 3 are the period 1/f, the peak current Ih, the background current Ib, the rise time tm, the fall time td, the peak time (segment BC), the pulse time Tp and the background time Tb. Here, the rise slope (segment AB) and the fall slope (segment CD) of the pulse are approximately constant over tm and over td, respectively, and are defined by (Ih−Ib)/tm and (Ih−Ib)/td, respectively.

Figure 4:
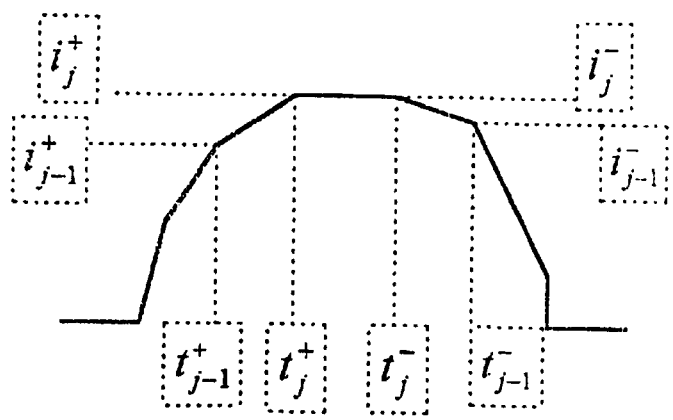
FIG. 4 shows diagrammatically the decomposition of a pulse of any shape.

In general and thus as shown in FIG. 4, a pulsed-current wavetrain is a periodic succession of 4 elements, namely a background current level, a continuous and non-monotonic current rise from the background current level to the peak current level, a peak current level and a continuous and non-monotonic fall from a peak current level to a background current level. Whatever the shape of this wavetrain, each of these elements may be decomposed into a series of current segments of length $\Delta i_j$ and of duration $\Delta t_j$, as shown in FIG. 4.

The current rise is therefore defined by a succession of n current segments of positive slope. Likewise, the current fall is defined by a succession of k current segments of negative slope.

The current rise starts when the value of the slope of a significant number of consecutive current segments moves away from 0 in the positive direction. The current rise stops when the value of the slope of a significant number of current segments is close to 0 (the peak current level).

The current fall starts when the value of the slope of a significant number of current segments moves away from 0 in the negative direction. It terminates when the value of the slope of a significant number of current segments approaches 0 (the background current level).

The total values of the rise and fall slopes are therefore defined as follows.

$$\Delta i^+_j = i^+_j - i^+_{j-1}$$

$$\Delta t^+_j = t^+_j - t^+_{j-1}$$

$$P^+_j = \Delta i^+_j / \Delta t^+_j$$

The rise slope (Pm) is therefore given by the formula:

$$Pm = \frac{1}{n} \sum_j^n P^+_j$$

Likewise:

$$\Delta i^-_j = i^-_j - i^-_{j-1}$$

$$\Delta t^-_j = t^-_{j-1} - t^-_j$$

$$P^-_j = \Delta i^-_j / \Delta t^-_j$$

The fall slope (Pd) is therefore given by the formula:

$$Pd = \frac{1}{k} \sum_j^k P^-_j$$

Thus, it is always possible, from a signal of any (but not triangular) shape and preferably with a peak time of non-zero duration, to determine the rise and/or fall slopes of this signal.

Figure 5:
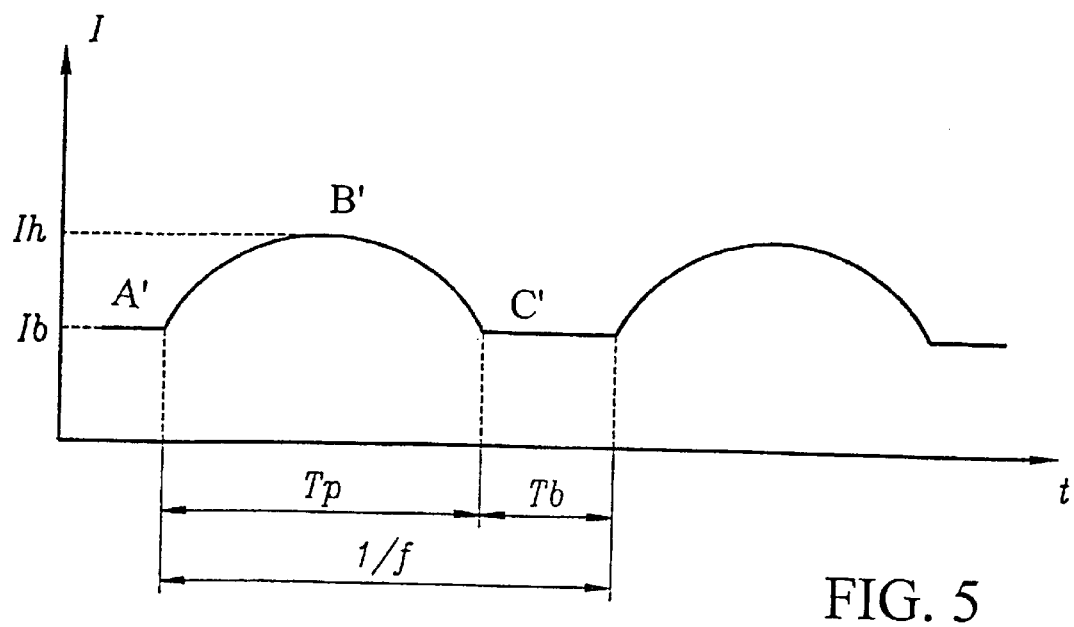
FIGS. 5 and 6 are graphs showing, respectively, sinusoidal pulses according to the invention and triangular pulses outside the scope of the present invention.

FIG. 5 shows a wavetrain of sinusoidal shape which can be decomposed as described above and shown in FIG. 4, so as to determine therefrom the rise and/or fall slopes of the current.

Figure 6:
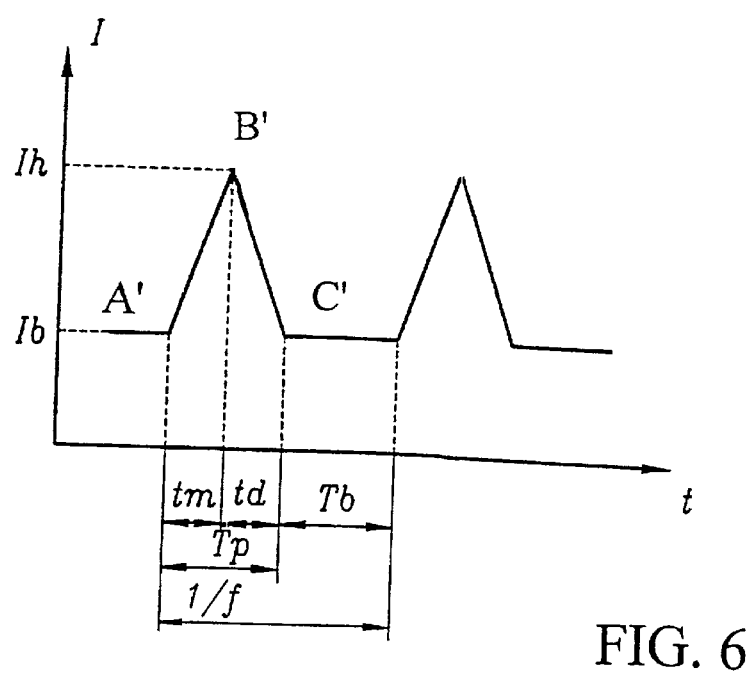

FIG. 6, given by way of comparison, shows a triangular electric pulse not in accordance with the invention. In other words, the peak time (Th) of the pulses in FIG. 6 is zero.

The parameters defining the signals in FIGS. 5 and 6 are identical to those in FIG. 3.

The Applicant has evaluated the influence of the rise and/or fall slopes and of the pulse frequency on the noise level. Thus, the ranges of values in which these parameters allow a significant reduction in noise to be obtained, while maintaining good weld bead production, have been determined. The resulting set current was delivered by a transistorized generator conventionally used in arc welding in pulsed mode.

Surprisingly, the Applicant has found that, for non-triangular pulses and for a given wire feed speed, the use of low fall and rise slopes of between 50 A/ms and 100 A/ms, and more particularly of between 100 A/ms and 500 A/ms, as well as the use of low pulse frequencies, i.e. corresponding to drops with a diameter, at the moment of their release, of between 1 and 1.4, and more particularly approximately 1.2, times the diameter of the wire, result in a considerable reduction in the noise levels generated, while still maintaining good operating weldability.

The experimental results are given in the tables below, in which Pm and Pd denote, respectively, the rise slope and the fall slope which are approximately constant over the times tm and td, respectively, for each test presented.

TABLE 1

| Wire feed speed (m/min) | 2 | 4 | 6 |
| --- | --- | --- | --- |
| $I_H$ (A) | 360 | 390 | 390 |
| $I_B$ (A) | 30 | 30 | 110 |
| $t_m$ (ms) | 0.5 | 0.6 | 0.6 |
| $t_d$ (ms) | 0.9 | 0.8 | 0.6 |
| $P_m$ (A/ms) | 660 | 600 | 467 |
| $P_d$ (A/ms) | 367 | 450 | 467 |
| $T_h$ (ms) | 1.6 | 1.5 | 1.5 |
| $T_b$ (ms) | 14 | 5 | 3.1 |
| f (Hz) | 57 | 127 | 171 |
| noise (dBA) | 86.5 | 89.5 | 90 |

Table 1 shows, for different wire feed speeds, using a 1.2 mm diameter steel wire and a gas mixture (Ar+3% $CO_2$+1% $O_2$) conventionally used in pulsed MAG (Metal Active Gas) welding, the typical values of the parameters of a trapezoidal pulse according to the invention (see FIG. 3). The noise levels indicated were measured at 40 cm from the arc.

TABLE 2

| Wire feed speed (m/min) | 2 | 4 | 6 |
| --- | --- | --- | --- |
| $I_H$ (A) | 330 | 330 | 330 |
| $I_B$ (A) | 50 | 110 | 170 |
| $t_m$ (ms) | 1.5 | 1.5 | 1.5 |
| $t_d$ (ms) | 1.5 | 1.5 | 1.5 |
| $P_m$ (A/ms) | 187 | 147 | 107 |
| $P_d$ (A/ms) | 187 | 147 | 107 |
| $T_h$ (ms) | 2 | 2 | 2 |
| $T_b$ (ms) | 23 | 12.8 | 6.1 |
| f (Hz) | 35.7 | 56 | 90 |
| noise (dBA) | 81 | 83 | 81 |

Table 2 shows, under the same conditions, the values taken by the same parameters with reduced rise and fall slopes and reduced pulse frequencies.

This very clearly shows the reduction in noise provided by the use of lower slopes and pulse frequencies according to the invention, namely a saving of between 5 dBA and 9 dBA for this range of wire feed speeds. The operating weldability is still good, although the arcs are not so stiff as in the case of Table 1 ("splayed" arcs).

In other words, by comparing the results given in Tables 1 and 2 above, it may be seen that a reduction in the slope values leads to an even more significant reduction in acoustic noise.

TABLE 3

| Wire feed speed (m/min) | 1.3 | 3 |
| --- | --- | --- |
| $I_H$ (A) | 340 | 360 |
| $I_B$ (A) | 30 | 30 |
| $t_m$ (ms) | 0.6 | 0.6 |
| $t_d$ (ms) | 0.8 | 0.8 |
| $P_m$ (A/ms) | 517 | 550 |
| $P_d$ (A/ms) | 388 | 413 |
| $T_h$ (ms) | 1.3 | 1.3 |
| $T_b$ (ms) | 23.8 | 10.2 |
| f (Hz) | 38 | 77 |
| noise (dBA) | 85 | 87.5 |

TABLE 4

| Wire feed speed (m/min) | 1.3 | 3 |
| --- | --- | --- |
| $I_H$ (A) | 340 | 360 |
| $I_B$ (A) | 30 | 30 |
| $t_m$ (ms) | 1.5 | 1.5 |
| $t_d$ (ms) | 1.5 | 1.5 |
| $P_m$ (A/ms) | 207 | 200 |
| $P_d$ (A/ms) | 207 | 200 |
| $T_h$ (ms) | 1.4 | 2 |
| $T_b$ (ms) | 36.7 | 20.4 |
| f (Hz) | 24 | 39 |
| noise (dBA) | 83.3 | 84.5 |

Tables 3 and 4 show the results of a welding programme, carried out this time on a 1.2 mm diameter stainless steel wire and with a gas mixture (Ar+3% $CO_2$+1% $H_2$) conventionally used in pulsed MAG welding. Table 3 corresponds to a first trapezoidal signal according to the invention (see FIG. 3) and Table 4 corresponds to a trapezoidal signal with reduced rise and fall slopes and reduced pulse frequency. Here too, it may be seen that there is a reduction in noise when gentler rise and fall slopes and lower frequencies are used.

The process according to the invention may be applied to any type of pulsed-current arc welding, with or without a consumable wire, and using pulses, especially trapezoidal pulses or pulses of various composed shapes, such as combinations of trapezoidal, triangular, sinusoidal, rectangular and square patterns.

As mentioned above, the trapezoidal shape is the pulse shape most used in pulsed-current arc welding. Nevertheless, due to the regulating of the current inherent in the technology of the welding set used, a given current waveform, in particular of trapezoidal shape, may be substantially modified and/or distorted, that is to say the current regulated by the welding set may not exactly follow the set current which is delivered thereto.

However, in such cases, it is possible to reconstruct the set current waveform from the "distorted" shape, i.e. the shape observed by measuring the current. To do this, the current waveform is firstly determined by means of an oscilloscope connected to a current measurement sensor whose bandwidth is at least 10 kHz.

Usually, the measurement sensor is placed in the welding circuit, for example in the torch system, and the measurement is carried out during the welding operation; nevertheless, care should be taken to ensure that the operation of the generator during measurement is not precluded by the manufacturer in the instruction manual for the generator.

Next, the set shape is reconstructed from the measured shape of the pulse (so-called "distorted" shape), as shown diagrammatically in the appended FIGS. 7 to 10.

More specifically, FIG. 7 shows the diagram of a trapezoidal pulse (set shape) and FIGS. 8 to 10 show diagrammatically certain distortions likely to affect the trapezoidal set shape, such as those appearing on the screen of the oscilloscope.

In particular, FIGS. 8 and 10 especially show diagrammatically the phenomenon known in power electronics as "overshooting", which corresponds to the current exceeding the set current at one or more moments, due to the response time of the generator.

This phenomenon gives the peak time (Th) and/or the background time (Tb) of the current a saw-tooth, i.e. irregular, appearance.

When there is a "distorted" pulse, such as those shown in FIGS. 8 and 10, the trapezoidal set pulse shown in FIG. 7 may be obtained by calculating the mean value of the current.

When there is a "distorted" pulse, such as that shown in FIG. 9, the trapezoidal set pulse is obtained by calculating the mean value of the current from the trace of the peak time (Th) plateau and from the tangent (Tgm) at the start of the rise and the tangent (Tgd) at the start of the fall of the current.

Furthermore, it is found that programmes established with low pulse frequencies and gentle slopes generally lead to higher mean current amplitudes and therefore to hotter weld pools. This is an advantage, especially in the case of downhand welding of stainless steels which, in the presence of a slightly oxidizing gas, are relatively difficult to wet.

What is claimed is:

1. A pulsed-current arc welding process for welding two pieces together, which comprises the steps of:

providing a consumable electrode wire;

delivering a pulsed-current electrical arc between the consumable electrode wire and the pieces to be welded;

progressively melting the consumable electrode wire thereby forming a weld bead between the pieces;

said melting being carried out by a spray-arc mode whereby a single drop of molten metal is transferred from the wire to the weld bead, for each current pulse; and wherein each electric current pulse has at least one of rise and fall slopes of between 50 A/ms and 1000 A/ms, and wherein the pulses are not triangular.

2. The arc welding process according to claim 1, wherein each pulse has a peak time of non-zero duration.

3. The arc welding process according to claim 1, wherein said rise and fall slopes are between 100 A/ms and 600 A/ms.

4. The arc welding process according to claim 1, wherein the pulse frequency is adjusted so as to obtain drops of molten metal with a diameter, at the moment of their release, ranging between 1 and 1.4 times the diameter of said consumable wire.

5. The arc welding process according to claim 4, wherein the pulse frequency is adjusted so as to obtain drops of molten metal with a diameter, at the moment of their release, of approximately 1.2 times the diameter of said consumable wire.

6. The arc welding process according to claim 1, wherein the pulses are trapezoidal.

7. The arc welding process according to claim 1, wherein the pulses comprise a combination of several identical, similar or different patterns selected from the group consisting of trapezoidal, sinusoidal, rectangular and square patterns.

8. The arc welding process according to claim 1, wherein the process is carried out under a flow of shielding gas that includes an active gas.

9. The arc welding process according to claim 8, wherein the active shielding gas comprises at least one of argon and helium, and at least one compound selected from the group consisting carbon dioxide, hydrogen, oxygen and mixtures thereof.

* * * * *